Sept. 9, 1958 J. D. CONFELD 2,851,530

MESSAGE REGISTER

Filed Nov. 19, 1953 6 Sheets-Sheet 1

INVENTOR.
JAMES D. CONFELD
BY J. Warren Whitesel
ATTORNEY

Sept. 9, 1958 J. D. CONFELD 2,851,530

MESSAGE REGISTER

Filed Nov. 19, 1953 6 Sheets-Sheet 2

LINE CIRCUIT 110

Sept. 9, 1958 J. D. CONFELD 2,851,530

MESSAGE REGISTER

Filed Nov. 19, 1953 6 Sheets-Sheet 3

TRUNK CIRCUIT 113

Sept. 9, 1958 J. D. CONFELD 2,851,530

MESSAGE REGISTER

Filed Nov. 19, 1953 6 Sheets-Sheet 4

TRUNK CIRCUIT 113

Sept. 9, 1958

J. D. CONFELD 2,851,530

MESSAGE REGISTER

Filed Nov. 19, 1953

6 Sheets-Sheet 5

United States Patent Office 2,851,530

Patented Sept. 9, 1958

2,851,530

MESSAGE REGISTER

James D. Confeld, Rochester, N. Y., assignor, by mesne assignments, to General Dynamics Corporation, a corporation of Delaware Application November 19, 1953, Serial No. 393,196

26 Claims. (Cl. 179—8.5)

This invention relates to an electro-mechanical telephone system, and more particularly to a message register which is adapted to store information indicative of the amount to be charged for a long distance call. This invention is adapted to function when connected with a line finder and a selector switch. For an example of a suitable finder switch, see the Kessler Patent 2,656,416. For an example of a suitable selector, see the co-pending Pharis application S. N. 260,736, filed December 8, 1951, now patent No. 2,707,727. Both the Kessler patent and the Pharis application are assigned to the assignee of the subject invention.

In the past, standard telephone practice has been for an operator to make a toll ticket for each long distance call. On this ticket she records the destination of the call, the calling party's number, and the amount of time consumed in conversation. This requires constant operator supervision with a resulting loss of efficiency; whereas, the cost of long distance calls could be reduced substantially if the burden of toll ticketing could be eliminated especially on heavy traffic trunks which carry many calls having the same characteristics, for example, calls between a city and its outlying suburb. Since the characteristics are the same, information such as called number, time of day, etc. may be eliminated and only the total charges need be kept. Records of this type are called "bulk metering" since charges are not broken out on a per call basis.

This invention provides an arrangement by means of which either single party subscribers or party line subscribers may call a distant exchange without having to go through an originating operator position, toll ticket information being stored on message registers.

An object of this invention is to provide a new and improved bulk metering long distance telephone system.

A further object of this invention is to provide message registers which record data on calls either from multi-party lines or from single party lines to a distant exchange.

Still a further object of this invention is to provide an electromechanical telephone system by means of which a subscriber may dial to seize a distant office without requiring the services of an originating operator.

Another object of this invention is to provide a circuit which is adapted to return signals indicative of the identity of the calling party, the minimum charge for a basic unit of time, overtime charges, a warning tone before overtime charges are applied, and other supervisory signals required for a long distance call.

An object of this invention is to provide a cyclic device which is reusable to transmit pulses indicative of the total charges for conversation time as well as to time both a basic unit of conversation time and periods of overtime conversation.

Still another object is to provide a register selector in a line circuit which has access to message registers that are individual to party line subscribers.

Also, an object of this invention is to prevent completion of calls where no message register is provided to store billing information.

Briefly, the above cited objects are accomplished by means of an electro-mechanical switch train which includes two talking conductors and two supervisory conductors that are utilized in extending calls from a subscriber's station to a one-way trunk circuit by way of a line circuit, line finder and selector. The first digit to be dialed by the subscriber causes the selector to seize the one-way trunk circuit. The second digit to be dialed by the subscriber is repeated by the trunk circuit and transmitted over one of the supervisory conductors back to the subscriber's line circuit. In the case of single party lines, this digit may consist of a single pulse which is absorbed in the line circuit. In the case of party line calls, the second digit causes a register selector to seize a message register individual to the calling subscriber's party line identification. Any suitable device may be used for a register selector such as a minor switch, for example. If the subscriber inadvertently or fraudulently dials a second digit indicative of a non-existent station, a supervisory marking is transmitted from the message register selector over a supervisory conductor to the trunk circuit. Responsive thereto, the control loop is opened and a busy tone is returned to the calling subscriber. On the other hand, if the register selector seizes a message register, the system is prepared for further operation; therefore, the calling subscriber may then dial added digits which are repeated by the trunk circuit to the distant office where an incoming selector is used to extend the call further. The return of answer supervision causes the trunk circuit to transmit a signal indicative of the minimum charge for a base unit of time for the particular calls served by this trunk circuit. Then, it counts out the base unit of time following which it periodically returns a signal for each overtime unit of conversation. All of this information is stored in bulk in a message register individual to the calling party. Periodically, the telephone company reads these registers and bills the subscriber accordingly.

Means is provided for preventing a calling subscriber from completing a call where the second digit represents a non-existent message register since then there would be no one to complain about an excessive charge and the telephone company would never know that a call had been placed. That is, responsive to such a second digit the control loop is opened and busy tone is returned—thus preventing a completed call. The problem is not encountered on calls from single party lines.

If calls are made to a distant office which is in a different charge zone, another trunk circuit similar to the one described above is seized; however, this time it returns different signals due to its internal strapping.

It is thought that a more complete understanding of this invention may be had by a description making reference to the attached drawings which will be described first briefly and then in detail. As in the case of most telephone systems, this invention is shown in the drawings as using a common battery having its positive terminal grounded; therefore, the expressions "(−) battery" and "grounded (+)" are used throughout the following specification to describe the source of power. It should be understood that any similar arrangement could be used without departing from the scope of this invention.

Figure 1:
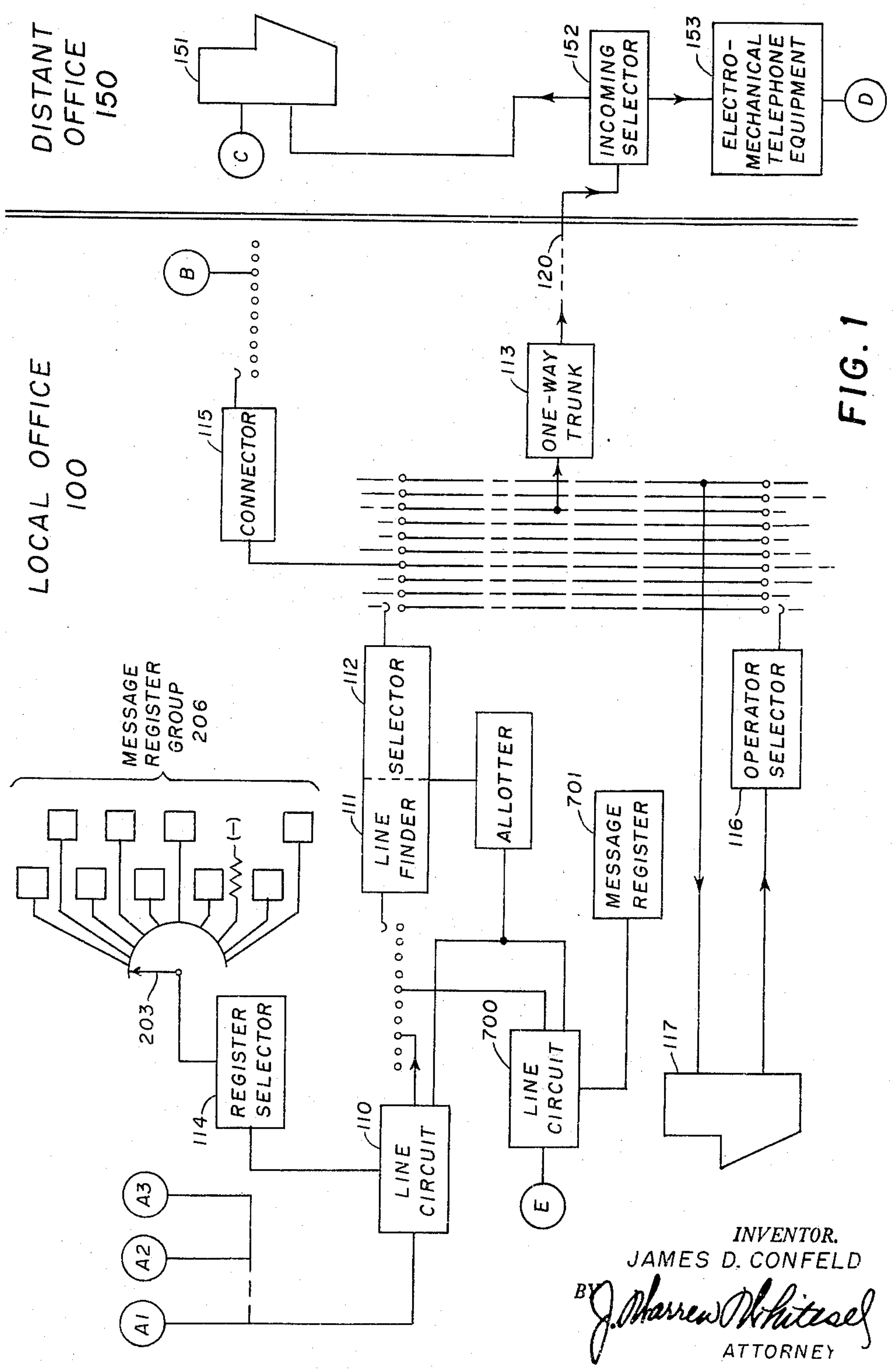
Fig. 1 shows a trunking diagram of a system using this invention.

Referring to Fig. 1, stations A1, A2 and A3 are party line subscribers, each having access to line circuit 110. To place a call, one of the subscribers, A1, for example, removes his receiver and line circuit 110 responds by signaling a line finder such as 111, for example, which operates to find the calling line. Then, subscriber A1 dials a proper first digit to cause selector 112 to seize a level which includes circuit means such as circuit 113 or trunk line 120, for example, connected to distant office 150. Next, subscriber A1 dials a second digit which identifies his line. Trunk circuit 113 receives these pulses and repeats them over a supervisory conductor which extends back through selector 112 and line finder 111, to line circuit 110 where a register selector 114 is stepped to seize one of a plurality of message registers corresponding or individual to the calling subscriber. Following this, he dials into incoming selector 152 which may seize an operator's position 151 or electro-mechanical telephone equipment 153 for completing the call to subscribers C or D, respectively, for example. Upon receipt of answer supervision, trunk circuit 113 transmits a certain number of pulses over a supervisory conductor to the subscriber's message register thereby storing information as to the charge for a basic unit of time. When the conversation has consumed almost the entire basic unit time period, a warning tone is returned to subscriber A1 and if he continues to hold his connection a signal is returned over the supervisory conductor to set the register for an overtime charge. This process is repeated periodically for each overtime period until subscriber A1 releases the connection.

Single party subscriber E performs the same functions as subscriber A1 does; however, in this case the second digit is absorbed by line circuit 700 since no register selector is used. The remainder of the equipment operates as described in the next preceding paragraph.

Certain other circuits are shown in Fig. 1 to illustrate a complete system; however, they are not material to the invention and therefore have not been shown in detail. For example, to complete local calls, either from subscribers A1–A3 or from subscriber E, selector 112 may be set to seize connector 115 which has access to called subscriber B. Normally, the service of an operator is not required; however, if necessary, operator 117 may be seized over the zero level of selector 112. To place an outgoing call, operator 117 may control operator selector 116 which has its bank multipled to bank terminals of selector 112.

Figures 2, 6:
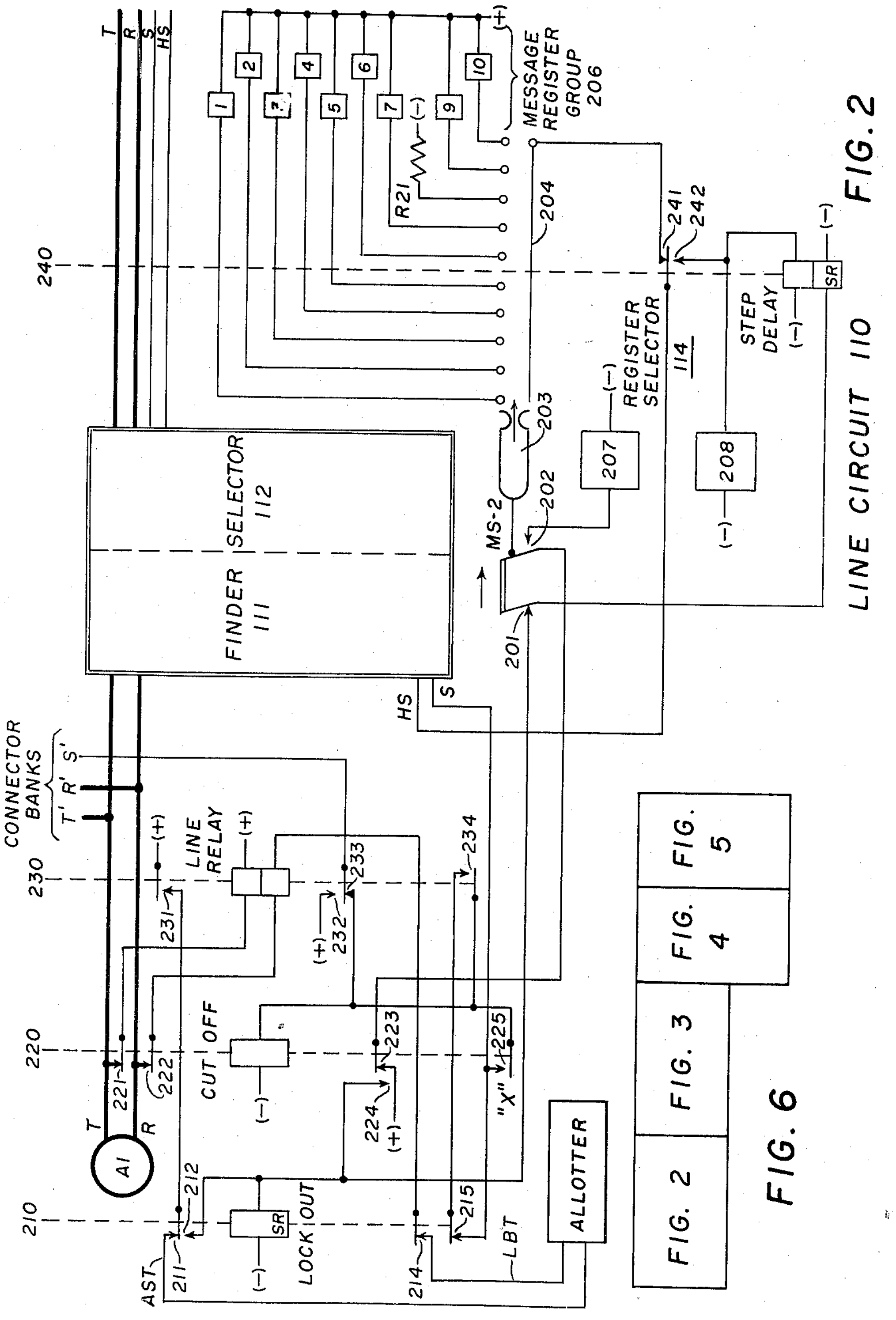
Fig. 2 shows a line circuit and a register selector.
Fig. 6 shows the manner in which Figs. 2–5 should be joined to illustrate the invention.
Figure 3:
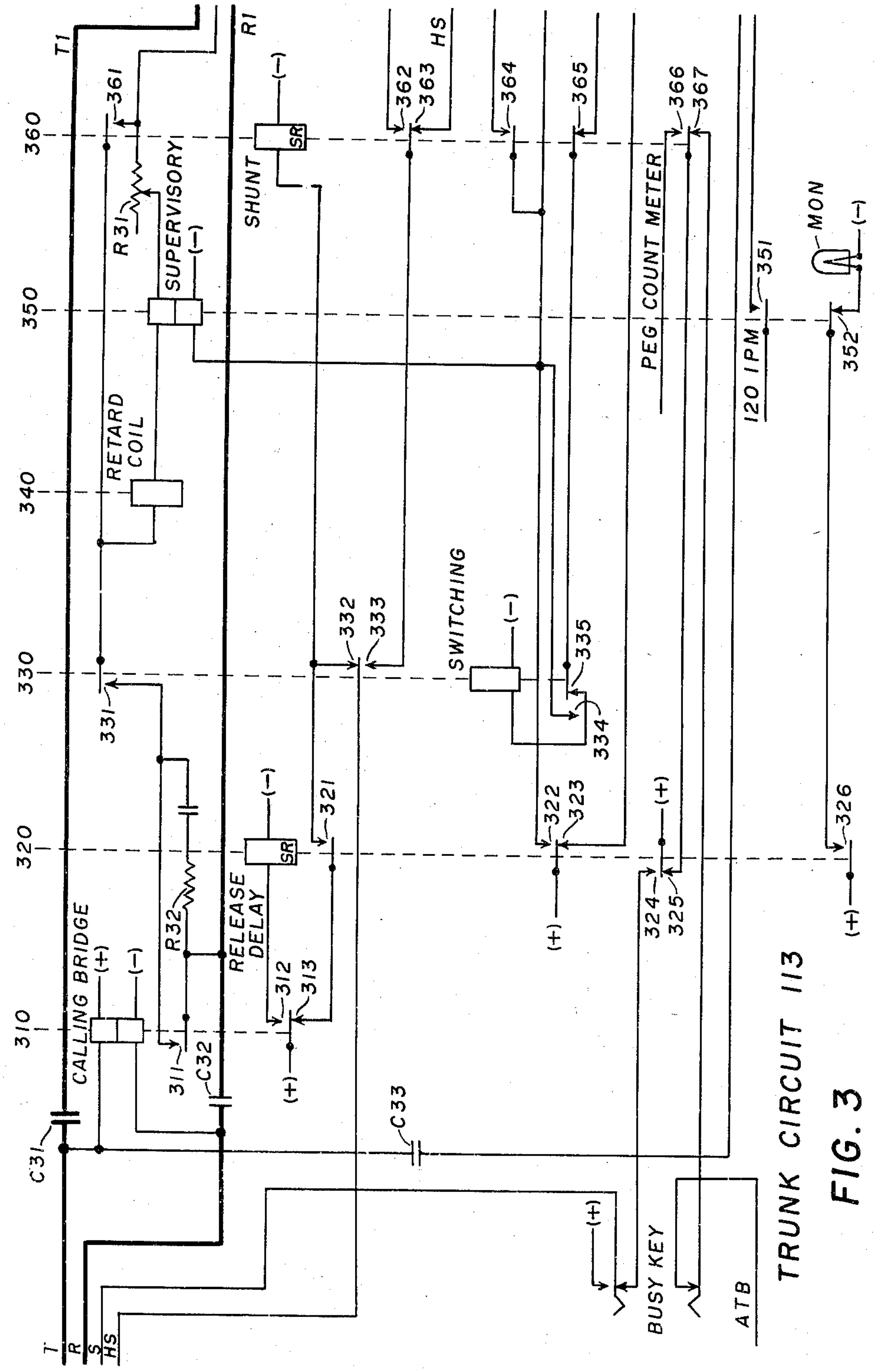
Figs. 3, 4 and 5 show a one-way trunk circuit which may be seized by the line circuit.
Figure 4:
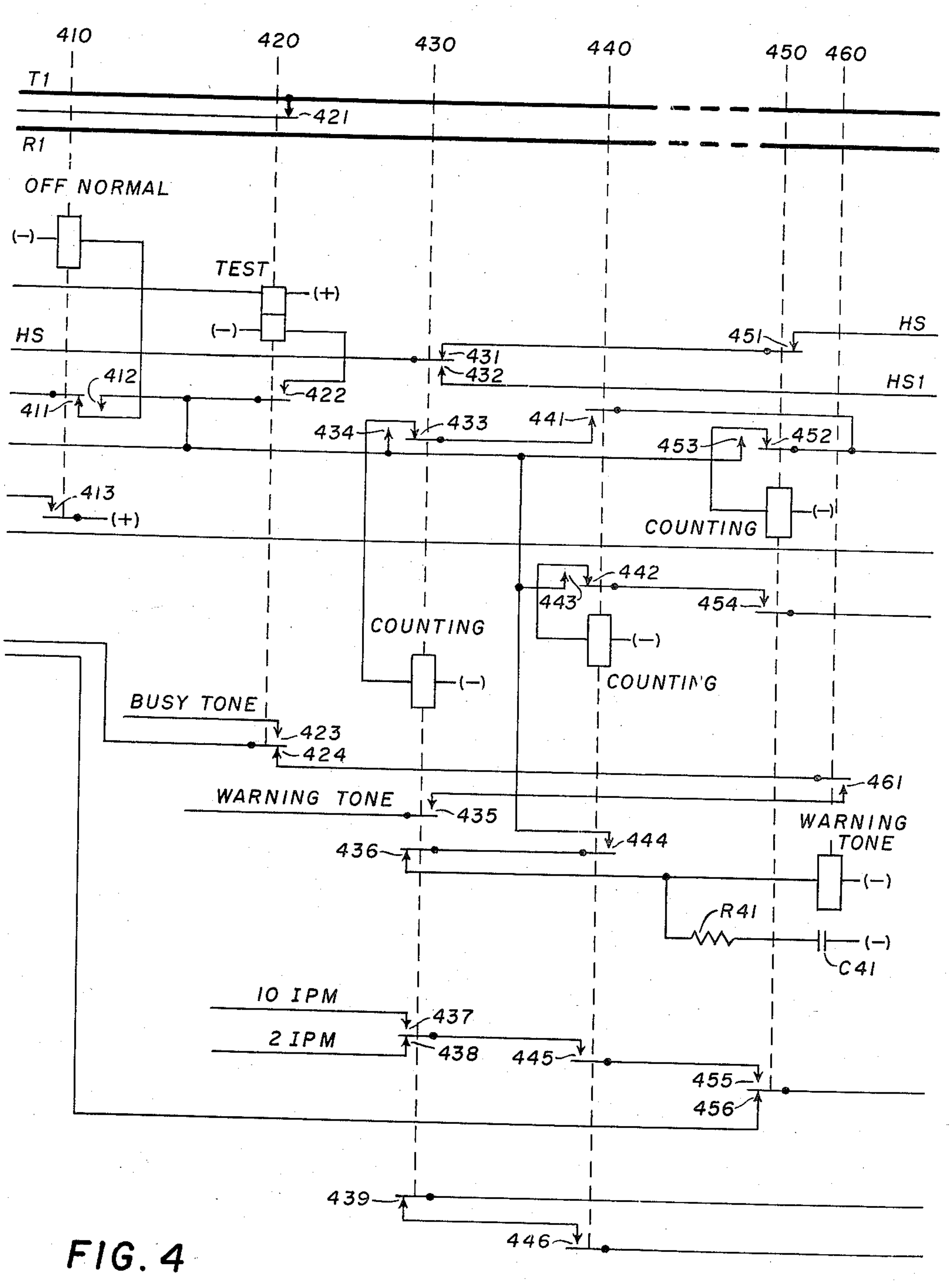
Figure 5:
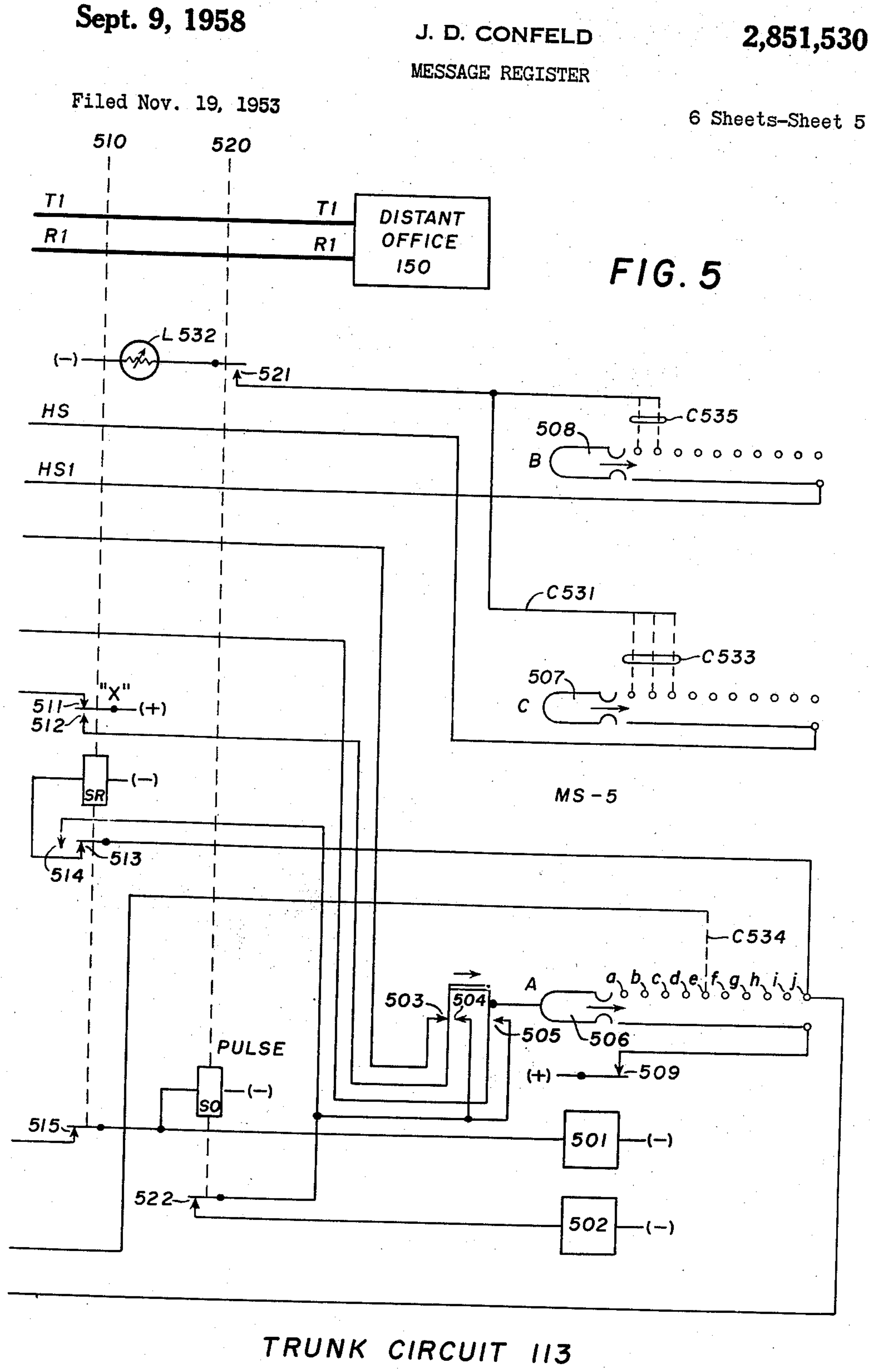
Figure 7:
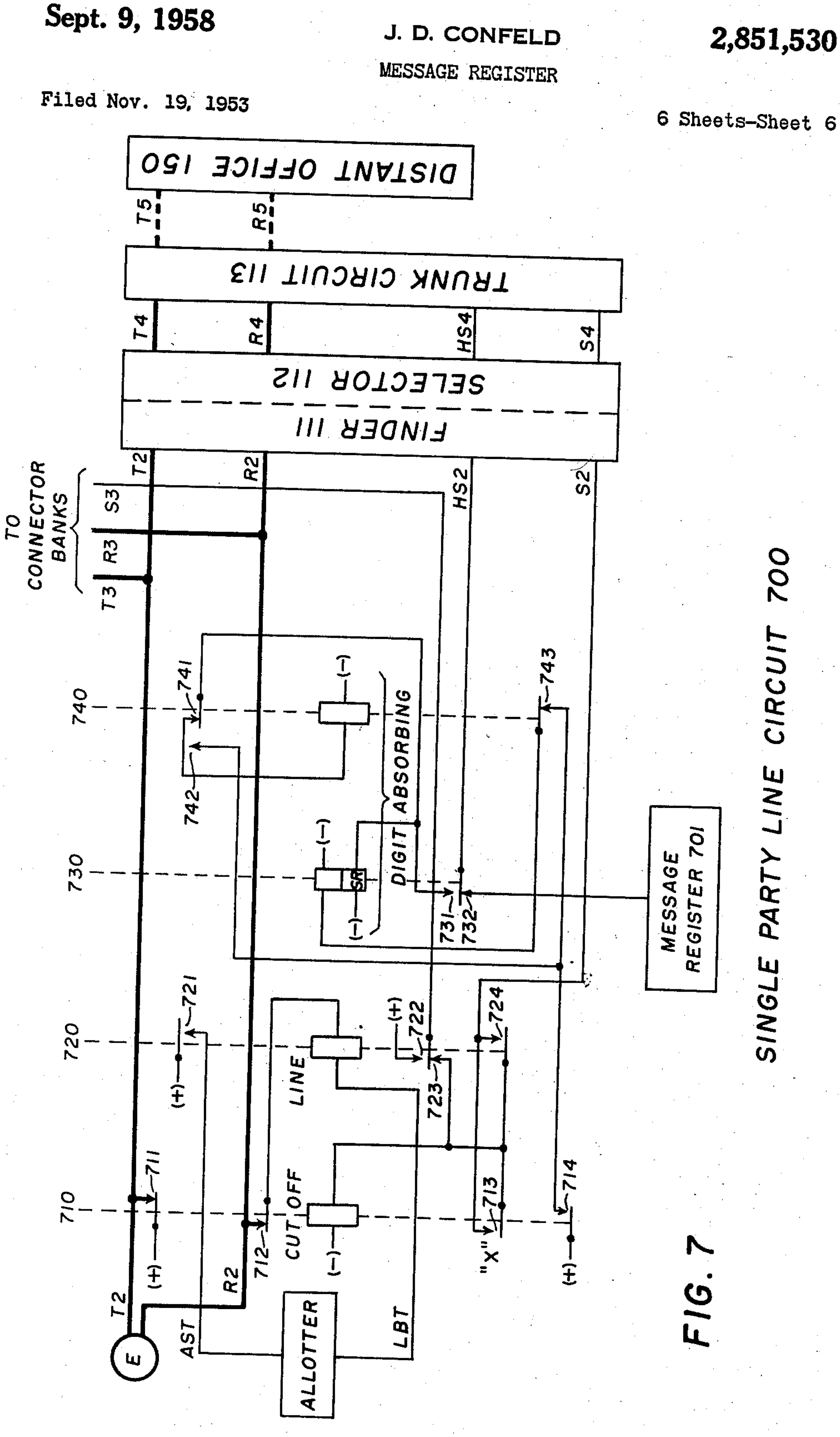
Fig. 7 shows a modification of this invention which is adapted to the use of a single party line.

Reference is made to Figs. 2–5 and 7 for a detailed description of equipment shown in Fig. 1 by hollow rectangles. For example, line circuit 110, register selector 114, and message register group 206 as shown in Fig. 2. Line finder 111 and selector 112 are more or less conventional and therefore they are shown in block diagram form near the center of Fig. 2. Trunk circuit 113 is shown in Figs. 3–5, and distant office 150 is shown in the upper central portion of Fig. 5. Fig. 7 shows line circuit 700 and message register 701.

Finder 111 and selector 112 may be any suitable device. However, it is contemplated that four conductor switches may be used in which case there are two talking conductors and two control conductors. Conventionally, the talking conductors are hereinafter called "tip" and "ring" conductors, one of the control conductors is hereinafter called a "sleeve" conductor, and the other of the conductors is hereinafter called a "helping" or "extra sleeve" conductor. For purposes of identification, the conductors are designated throughout the drawings by the letters T, R, S and HS respectively. For example, the finder in the Kessler Patent 2,656,416 shows conductors 1T, 1R, 1S and 1HS in Fig. 2. These may connect with conductors T, R, S, and HS, respectively, which connect with finder 111 in Fig. 2 of the subject drawing. This finder may have access to the selector of the Pharis application Serial No. 260,736, filed December 8, 1951. To make this connection, conductors T, R, S and HS (Fig. 1, Patent 2,656,416) would join with conductors T, R, S and HS (Fig. 2, application Serial No. 260,736). The selector brushes T', R', S' and HS' would then seize conductors T, R, S and HS on the right side of Fig. 2 of the subject drawing. Links busy tone conductor LBT corresponds to conductor 29 of the Kessler patent. Allotter start conductor AST corresponds to conductor 25 of the Kessler patent.

*Detailed description*

*Seizure.*—Subscriber A1 (Fig. 2) places a call to distant office 150 (Fig. 5). To do this, he removes his receiver thereby completing a loop from tip conductor T to ring conductor R over a circuit which may be traced from grounded (+), through the upper winding of relay 230, normal contacts 221, the subscriber's telephone set, conductor R, normal contacts 222, and the lower winding of line relay 230 to (−) battery by way of normal contacts 214 and links busy tone conductor LBT. If all finders should be busy, a tone would be returned to subscriber A1 via conductor LBT. Upon hearing this tone, he would abandon the call.

Assuming, however, that a finder is idle, line relay 230 operates. Contacts 232 are closed to extend grounded (+) over conductor S' to the connector banks thus marking line circuit 110 as busy to possible incoming calls from the connector banks. Contacts 231 are closed to mark allotter start conductor AST for starting line finder 111 which operates to find the calling line. When it is found, finder 111 returns in conventional manner (not shown) a grounded (+) marking on sleeve conductor S to cut-off relay 220 by way of conductor S, normal contacts 215, operated contacts 234 and the winding of cut-off relay 220 to (−) battery.

Cut-off relay 220 operates and locks to conductor S by way of contacts 225 which are preliminary contacts indicated by the symbol "X" which close before contacts 221 and 222 open. Thus relay 220 locks before its original path can be broken by release of relay 230. Operation of relay 220 also effects the release of relay 230 at contacts 221 and 222 whereupon contacts 232 open and contacts 233 close so that the connector banks are now marked busy by way of the ground marking returned from finder 111 over conductor S and through contacts 225 and 233 to conductor S'. Contacts 223 open to break a path to register selector release magnet 207 for preventing a false operation later during the call. Contacts 224 close to operate step delay relay 240 over a circuit extending from grounded (+) through operated contacts 224, normal contacts 201 of register selector 114 and the lower winding of slow-to-release relay 240 and to operate lockout relay 210.

The operation of lockout relay 210 effects the opening of contacts 211 to remove the marking from allotter start conductor AST. Contacts 212 have no utility except in line lockout, in which case ground is removed from conductor S to release cut-off relay 220 which operates line relay 230 to hold lockout relay 210 at contacts 231 and 212. In this case, contacts 211 are held open to prevent a useless operation of finder 111. A grounded (+) marking is extended from contacts 224 over off-normal contacts 201 of register selector 114 to step delay relay 240 which operates.

*First digit.*—Subscriber A1 receives dial tone from selector 112 in conventional manner, not shown, and proceeds to dial the first digit which is used to cause selector 112 to seize trunk circuit 113 over conductors T, R, S and HS, which are shown in the upper right corner of Fig. 2.

A circuit is now completed to operate calling bridge relay 310 from grounded (+) over the upper winding of calling bridge relay 310, conductor T, through finder 111, selector 112, calling subscriber A1's telephone set, conductor R, through the finder-selector link and the lower winding of calling bridge relay 310 to (−) battery.

Release delay relay 320 is operated from contacts 312. Contacts 322 close to furnish master ground for trunk circuit 113. Contacts 324 close to extend a grounded (+) marking over contacts of the busy key to the sleeve conductor S. This marking holds the finder-selector link operated and prevents other circuits from seizng trunk circuit 113. Contacts 326 close for lighting monitor lamp MON by way of normal contacts 352 as an indication that the trunk circuit is in use. This feature is provided for the benefit of maintenance personnel who may wish to check on the operation of trunk circuit 113.

*Second digit.*—The circuit is now ready for subscriber A1 to dial the second digit which he does by opening and closing the loop circuit across conductors T and R. The second digit that the calling subscriber is instructed to dial identifies his station. Probably, he dials his own last number which usually selects between ringing codes. Assuming that his ringing code number is "7," he opens and closes the loop circuit seven times. On each open pulse, calling bridge relay 310 releases and closes contacts 313 while opening contacts 312. Release delay relay 320 remains operated throughout pulsing due to its slow release characteristics.

*Register selector operation.*—Calling bridge relay 310 repeats the pulses of the second digit to operate register selector 114. That is, contacts 313 apply a grounded (+) marking to conductor HS on each open circuit pulse, the path being via contacts 313, 321 and 332, conductor HS, the selector and finder, conductor HS, contacts 242 and the upper winding of step delay relay 240 to battery (−) and in parallel therewith through the winding of stepping magnet 208 of register selector 114. Responsive to each repeated digit pulse, stepping magnet 208 operates to drive brush 203 over its associated terminals. On the first step, off-normal contacts 202 close and contacts 201 open. Contacts 201 open to break the operating circuit for step delay relay 240; however it continues to be held over its upper winding throughout pulsing due to its slow release characteristics.

Following termination of the last digit pulse, step delay relay 240 releases and register selector 114 is operated with brush 203 resting on the seventh terminal since it was assumed that subscriber A1 dialed "7." Thus, a circuit to grounded (+) is completed through message register 7, shorting brush 203, bar 204 and contacts 241 to the HS conductor and through the finder and selector to contacts 332.

A circuit is prepared for testing to determine whether brush 203 is connected with a message register. That is, responsive to the first release of calling bridge relay 310, a circuit is completed from grounded (+) through contacts 313 and 321 to (−) battery through shunt relay 360 which operates. Relay 360 is slow release and therefore continues to hold throughout the entire digit pulse train.

Contacts 364 close to operate off-normal relay 410 over the following circuit: Master ground applied through contacts 322, 364, 411 and the winding of off-normal relay 410 to (−) battery. This relay operates and closes its contacts 412 thereby locking to master ground independently of contacts 364.

Following receipt of the last pulse in the second pulse train, calling bridge relay 310 remains operated to hold contacts 313 open, thereby permitting shunt relay 360 to release.

Responsive to the release of relay 360, a circuit is completed from grounded (+) through contacts 413, 365 and 335 to (−) battery by way of switching relay 330 which operates. Contacts 332 open and 333 close to prepare a test circuit which is to be completed upon receipts of the next digit pulse. Switching relay 330 locks to master ground by way of contacts 334 and 322.

*Third digit.*—The circuit is now ready to receive the third train of digit pulses from calling station A1. Responsive to the first pulse, calling bridge relay 310 releases to close contacts 313 while opening contacts 312. Contacts 313 complete a circuit from grounded (+) through contacts 321 for re-operating shunt relay 360. Contacts 362 close and since switching relay 330 is now operated, a path is completed from grounded (+) through the upper winding of test relay 420, operated contacts 362 and 333, HS conductor, selector 112 and finder 111, HS lead, contacts 241, bar 204 and shorting brush 203, the seventh terminal of register selector 114 and the connected message register to grounded (+). Since both terminals of relay 420 are grounded, nothing happens. On the other hand, if, for the second digit pulse train, subscriber A1 had transmitted a digit corresponding to an unassigned line as for example eight digit pulses instead of seven in the present disclosure, shorting brush 203 would be resting on the eighth terminal which is connected to resistance battery instead of to a register and ground, resistance battery there being used to mark absence of a register, i. e., an unassigned substation; hence, (−) battery would be extended through resistor R21, terminal 8 of the minor switch, shorting brush 203, bar 204, contacts 241, HS conductor, finder and selector, contacts 333 and 362 to grounded (+) applied through the upper windings of test relay 420. Relay 420 operates and locks over contacts 422 to master ground applied through contacts 322. Contacts 423 close to extend a busy tone to conductor T and hence subscriber A1. Contacts 421 open to break the circuit extending from conductor T1 through contacts 421, 361, 331 and 311 to conductor R1. Since this is the pulsing path over which equipment at the distant office must be operated, it is impossible for subscriber A1 to complete a call. Upon hearing the busy tone he abandons the call.

Assuming that test relay 420 does not operate, calling bridge relay 310 is effective for repeating digit pulses to distant exchange 150 for setting telephone equipment to seize a called subscriber or an operator, as the case may be. That is, on each digit pulse, relay 310 releases to open contacts 311 thereby opening the loop across outgoing conductors T1 and R1 which extends to distant office 150. This loop may be traced from distant office 150, over conductor T1, through contacts 421, 361, 331, 311 and conductor R1 back to distant office 150. A similar pulse is transmitted upon receipt of each succeeding pulse in either this or succeeding digit pulse trains.

*Conversation timing and metering*

*Answer supervision.*—Upon completion of the connection, a subscriber or operator in distant exchange 150 answers to transmit reverse battery supervision over conductors T1 and R1. That is, during the dialing and switch setting portion of a call, a positive polarity is applied to conductor T1 and a negative polarity is applied to conductor R1 in any suitable manner (not shown). Responsive to an answer at the distant exchange, the polarity of conductors T1 and R1 is reversed in any suitable manner so that differential supervisory relay 350 operates over the following circuit: conductor T1, contacts 421, resistor R31, the upper winding of relay 350, retard coil 340, contacts 331 and 311 to conductor R1. The opening of contacts 352 extinguishes bulb MON as an indication to maintenance personnel that the trunk circuit is not being tied-up during a switch setting process.

*Base time unit charge.*—A series of (−) battery message register control pulses are returned under the control of a cyclic counting device which is shown in the drawing as a minor switch to store a marking indicative of the charge for a base unit of time on calls between offices 100 and 150. This process is started by receipt of answer supervision at which time contacts 351 connect ground pulses that reoccur at a rate of 120 I. P. M. over contacts 456 and 515 to minor switch stepping magnet 501 and in parallel to pulse relay 520—each of which operates at 120 I. P. M. Minor switch magnet 501 operates to step brushes 506, 507 and 508 over their associated bank contacts at the rate of 120 I. P. M.

On each pulse, a circuit is completed by pulse relay 520 from (—) battery through ballast lamp L532, contacts 521, conductor C531, and a series of straps C533 to bank "C" of the minor switch. One strap is used for each unit of charge required for a minimum time base period on calls to distant office 150. For example, if such a call costs thirty cents and if each setting of message register 7 (Fig. 2) represents ten cents, three straps C533 are connected from conductor C531 to terminals in the "C" level of the minor switch. Thus, contacts 521 transmit three (—) battery pulses by way of conductor HS over the following circuit: (—) battery, lamp L532, contacts 521, conductor C531, straps C533, brush 507, conductor HS, contacts 451, 431, 363, 333, conductor HS, through the selector and finder and contacts 241, bar 204, shorting brush 203, the seventh terminal and message register 7 to grounded (+). Hence, register 7 receives three impulses which is an indication of a thirty cents charge. It might be noted that pulsing relay 520 is made slow-to-operate to insure completion of the pulsing path by brushes of the minor switch before message register pulses are sent by contacts 521. The length of the register pulse is determined by how long the 120 I. P. M. interrupter holds relay 520 operated.

Another feature worth noting at this time is the manner in which false registrations and hence false billing charges are prevented. Message register pulses are extended from (—) battery through ballast lamp L532 and over conductor HS to store billing information in register 7, as previously explained. Register selector 114 is stepped by grounded (+) pulses from contacts 313 which also are extended over conductor HS. If contacts 241 should be falsely closed at this time, the message register would not be operated by the ground pulses. Furthermore, telephone equipment extends over many exposed connections such as at terminal blocks, for example. An improper touching may occur at this point. For example maintenance personnel may accidentally short the conductor HS to a mounting frame as by a tool, for example. Since the frame is at ground potential, no false billing information would be stored in the message registers which respond only to (—) battery pulses.

Following registration of a charge for a basic unit of time, minor switch MS–5 is returned to normal in preparation for timing the call into overtime. The minor switch prepares for this operation as it takes its first step responsive to which off-normal contacts 503 open while off-normal contacts 504 and 505 close. On the tenth step, a circuit is completed from grounded (+) through contacts 509, shorting brush 506, the last terminal of the A level and contacts 513 to (—) battery via the winding of counting relay 510 which operates and locks through contacts 514 and 504 to grounded (+) on preliminary or "X" contacts 512 which close before contacts 513 open. This same grounded (+) marking (on contacts 512) is effective over contacts 504 and 522 for operating release magnet 502 thus causing the minor switch to return to normal.

Contacts 509 are operated by stepping magnet 501; hence, the minor switch cannot be released until it has taken a complete step because it steps on operation of magnet 501 while relay 510 cannot operate until release of magnet 501. Relay 510 must close contacts 512 before release magnet 502 may operate.

When minor switch MS–5 returns to normal following registration of a base unit charge, off-normal contacts 503 close and contacts 504 and 505 open. It will be observed that the locking path of relay 510 is broken at contacts 504; however, this relay is held briefly due to its slow release characteristics. Therefore, for a short interval of time, a circuit is completed for operating counting relay 450 as follows: grounded (+) through contacts 512, off-normal contacts 503, contacts 452 and the winding of relay 450 to (—) battery.

Relay 450 operates and locks via its contacts 453 to master ground applied through contacts 322. Contacts 451 open to disconnect conductor HS. At contacts 454, a circuit is completed from grounded (+) applied through contacts 511, 454 and 442 to (—) battery through the winding of counting relay 440 which in turn operates and locks to master ground at contacts 443. With counting relays 450 and 440 locked operated and with relay 510 released, a circuit is completed from a two impulse per minute interrupter over contacts 438, 445, 455 and 515 to minor switch stepping magnet 501 and pulse relay 520 in parallel therewith.

*Measuring base time period.*—The minor switch is now operated a second time to count off a basic unit of time. Note, however, that during this second operation of the minor switch, no pulses are returned to the message registers since conductor HS is open at contacts 451. The minor switch steps once every thirty seconds until it finds a marking which indicates the elapse of a basic unit of time. In the arrangement shown in the drawing, the minor switch measures two and one-half minutes which is indicated by strap C534 attached to terminal "*e*" of the "A" level. A circuit is now completed from grounded (+) through contacts 509, shorting brush 506, terminal "*e*" over strap C534 and contacts 439, and 446, terminal "*j*" and contacts 513 to (—) battery through the winding of counting relay 510 which operates. Relay 510 closes its contacts 512 thereby completing its own locking circuit as follows: grounded (+) through operated contacts 512, 504 and contacts 514 to (—) battery through the winding of relay 510. Also release magnet 502 operates in parallel with this locking circuit, the path being from (—) battery through the winding of magnet 502 and contacts 522, 504 and 512. The minor switch releases and returns to normal thereby opening contacts 504 and 505 while closing contacts 503. A circuit is now completed for operating counting relay 430 during the release time of relay 510. This circuit may be traced from (—) battery, through the winding of relay 430, contacts 433, 441, 503 and 512 to grounded (+). Relay 430 locks to master ground by way of contacts 434 and 322. Counting relay 510 is released.

If another basic unit of time were required, strap C534 would have been connected with a different terminal on level "A" according to the following table:

| Terminal | *a* | *b* | *c* | *d* | *e* | *f* | *g* | *h* | *i* | *j* |
|---|---|---|---|---|---|---|---|---|---|---|
| Basic Time Unit (in minutes) | ½ | 1 | 1½ | 2 | 2½ | 3 | 3½ | 4 | 4½ | 5 |

A warning tone is transmitted to the calling subscriber as an indication that he is about to be charged for an overtime period. When counting relay 440 operated responsive to the first release of the minor switch, a circuit was completed from master ground, through contacts 322, 444 and 436, to operate warning tone relay 460 and to charge capacitor C41 through resistor R41. When counting relay 430 operates responsive to the second drop back of the minor switch, it opens contacts 436 and closes contacts 435. The circuit to warning tone relay 460 is now open; however, relay 460 does not release since the charge stored on capacitor C41 feeds through the winding of relay 460 to hold it operated for the interval of time required for capacitor C41 to discharge. During this time interval, the warning tone is connected through contacts 435, 461 and 424 to tip conductor T. After the discharge of capacitor C41, contacts 461 open and the warning tone is removed.

*Overtime charges.*—Minor switch MS–5 is stepped a third time to charge for overtime according to the arrangement of straps C535. With relays 430, 440 and 450 operated, a circuit is completed from a ten impulse per minute interrupter through contacts 437, 445, 455 and 515 to operate pulse relay 520 and stepping magnet 501 in parallel. Therefore, the minor switch begins to step at the rate of ten steps per minute so that it makes contact with a new terminal each six seconds.

Level "B" is provided with straps C535 according to the charge for each minute of overtime. For example, if the calling subscriber is to be charged twenty cents per minute of overtime conversation, two straps are provided (assuming that each operation of register 7 represents ten cents). On the first step of the minor switch, a circuit is completed from (−) battery, through ballast lamp L532 and contacts 521, straps C535, shorting brush 508, lead HS1, and contacts 432, lead HS, contacts 363 and 333, conductor HS, selector and finder, contacts 241, bar 204, shorting brush 203, and the seventh terminal to message register 7 which is operated once. At the end of the first six second period, the minor switch takes another step and a similar pulse is transmitted through the second of straps C535, thus registering a total of two unit charges for a minute of overtime. Upon reaching the tenth step, grounded (+) is extended from contacts 509 through shorting brush 506 and terminal "j" of bank "A" to contacts 513 and counting relay 510 which operates and locks at contact 514. Contacts 512 close to operate release magnet 502 over contacts 504 and 522, thus causing the minor switch to return to normal. Relay 510 releases shortly after off-normal contacts 504 open.

Following this, the switch is stepped again at the rate of ten I. P. M. and two more register setting pulses are transmitted. This process repeats for each minute of overtime conversation.

*Release*

Since the calling subscriber is the one to be charged for the conversation, the switch release feature is entirely under his control. He replaces his receiver thereby opening the loop across conductors T and R, thus releasing calling bridge relay 310. Contacts 312 open to restore release delay relay 320. Contacts 322 open to remove master ground.

After calling bridge relay 310 releases and during the slow release time of relay 320, a circuit is completed for operating shunt relay 360 via contacts 313 and 321. Following release of relay 320 and the opening of contacts 321, shunt relay 360 remains operated for a brief interval determined by its slow release characteristics. During this interval, a circuit is completed from grounded (+) through contacts 325 and 366 for operating a peg count meter. This meter may be conventional in form and serves to count and record the number of calls extended through trunk circuit 113. When shunt relay 360 finally releases, a circuit is completed through contacts 325 and 367 for extending a ground (+) marking to all trunks busy conductor ATB.

The rest of the relays in the trunk circuit are released responsive to opening master ground at contacts 322. Switching relay 330 which previously was holding to master ground over contacts 334 is released. Off-normal relay 410 which was locked to master ground over contacts 412 is released. If test relay 420 had operated, it would have locked over contacts 422 and it too would now release. Relay 430 locked to master ground over contacts 434; therefore, it releases as does relay 440 which locked at contacts 443. Relay 450 previously locked over contacts 453 to master ground; therefore, it releases. If the minor switch is off-normal, contacts 505 are closed and release magnet 502 is operated from ground (+) on contacts 323 to cause the minor switch to return to normal.

The line circuit (Fig. 2) is released when release delay relay 320 opens contacts 324 to remove the busy ground marking from conductor S which extends through selector 112 and finder 111 to contacts 225 and the winding of cut-off relay 220 to (−) battery. It releases and opens contacts 224 for releasing lockout relay 210. Contacts 223 close to extend a grounded (+) marking over contacts 202 to the winding of release magnet 207, which operates, thus causing register selector 114 to return to normal. Contacts 221 and 222 return the line relay to its normal connection with the subscriber's line.

*Single party line*

Fig. 7 shows an arrangement by means of which a single party line may have access to trunk circuit 113. This figure may be substituted for Fig. 2 simply by connecting conductors T4, R4, S4 and HS4, shown at the right of Fig. 7, to conductors T, R, S and HS, shown at the left of Fig. 3. Essentially the circuits in this arrangement function as described above, except that it is necessary to absorb the second digit. As may be recalled from the description of Fig. 2, the second digit pulse train is effective for operating calling bridge relay 310 which repeats these particular pulses at contacts 313 to the circuit extended over contacts 321 and 332 to Fig. 2 via the HS conductor. In Fig. 2, these pulses cause register selector 114 to seize the particular message register which is individual to subscriber A1. In Fig. 7, there is no need to select such a register since only one is connected with line circuit 700.

More specifically, line circuit 700 is seized when subscriber E removes his telephone receiver to complete a loop across conductors T2 and R2. Line relay 720 operates over this loop, the circuit being from grounded (+) on contacts 711, through subscriber E's telephone set, to contacts 712, and through the winding of line relay 720 to link busy tone conductor LBT. Assuming that there is an idle link, (−) battery is connected to this conductor and relay 720 operates. Contacts 722 place a grounded (+) marking on conductor S3 to guard line circuit 700 against seizure from connector banks. Line relay 720 closes contacts 721 for placing a start marking on allotter start conductor AST. This marking causes finder 111 to seize terminals T2, R2, S2 and HS2, following which a grounded (+) marking is returned to conductor S2. This is connected by way of contacts 724, through the winding of cut-off relay 710, causing it to operate.

When cut-off relay 710 operates, it closes its "X" contacts 713 and locks to conductor S2. Shortly after contacts 713 close, contacts 711 and 712 open to remove line relay 720 from its connection to the talking conductors. Contacts 722 open; however, line circuit 700 is now guarded by the grounded (+) marking extended from finder 111 over conductor S2, contacts 713 and 723.

Digit absorbing relay 730 operates over an obvious circuit including contacts 714 and 743. Conductor HS2 is now connected through contacts 731 and 741 to the winding of digit absorbing relay 740, while message register 701 is disconnected to prevent any operation which might falsely charge subscriber E as having made a call at this time.

Subscriber E proceeds to dial the first digit causing selector 112 to seize trunk circuit 113 over conductors T4, R4, S4 and HS4.

*Second digit absorbed.*—The second digit is dialed as in the case of a party line; however, this digit has no function and therefore it is absorbed. It is assumed that each individual line is assigned the identification digit "1." Dialing of the second digit is necessary since all subscribers are preferably given the same instructions, thereby avoiding errors caused by subscriber confusion. More specifically, calling bridge relay 310 responds to the second digit pulse by opening and closing contacts 313 to repeat the digits transmitted by subscriber E. Responsive to the single pulse, grounded (+) is extended through contacts 313, 321 and 332 to conductors HS and HS2 in Fig. 7. This operates digit absorbing relay 740 over contacts 731 and 741. Contacts 743 open; however, digit absorbing relay 730 is locked to conductor HS2 via its contacts 731. Relay 740 locks at contacts 742 to grounded (+) on operated contacts 714.

Following receipt of the second digit pulse, relay 730 releases; however, digit absorbing relay 740 remains locked under the influence of contacts 742 and 714. The call proceeds in the manner described above in connection with a call from subscriber A1. The message register setting pulses are extended from banks of the minor switch (right side of Fig. 5) over conductors HS and HS2 to message register 701 via contacts 732, as explained above in the section entitled, "Conversation Timing and Metering."

Following the conversation, subscriber E hangs-up and grounded (+) is removed from conductors S and S2 by release delay relay 320. Responsive thereto, cut-off relay 710, which was holding by way of its own contacts 713, is released. Contacts 714 open and digit absorbing relay 740 releases. Contacts 712 and 711 close and line relay 720 is returned to its normal connection with subscriber E. Line circuit 700 is now in release condition and ready for the next call.

Various other modifications may be made without departing from the spirit of my invention; therefore, I intend to claim not only the particular details shown, but also such other modifications as may fall within the scope of my invention.

What I claim is:

1. A telephone system comprising a plurality of telephone offices, trunk lines interconnecting said offices, said trunk lines terminated by trunk circuits, a plurality of subscriber lines in the first of said offices, a line circuit for each of said subscriber lines, at least one electro-mechanical switch for extending said subscribers lines to said trunk circuits, said electro-mechanical switch including talking conductors and at least one control conductor, means operative over said subscriber lines for transmitting switch controlling signals, means for repeating at least a portion of said controlling signals from said trunk circuit over said control conductor and through said switch to said line circuit, means for bulk metering billing information, means responsive to said repeated control to seize said bulk metering billing information means, and means for transmitting metering control signals from said trunk circuit over said control conductor to said bulk metering means.

2. The telephone system of claim 1 wherein said subscriber control comprises a plurality of digit pulse trains, and said portion of said subscriber control comprises a particular one of said digit pulse trains which is distinctive of said subscriber's identification.

3. The telephone system of claim 2 wherein said particular digit pulse train is the second of said plurality of digit pulse trains.

4. The telephone system of claim 1 wherein said means for seizing said metering means comprises a register selector connected to said line circuit, said bulk metering means comprises a plurality of message registers, each being individual to a single subscriber, said subscriber control comprising a plurality of digit pulse trains, and said repeated portion of said subscriber control comprises a particular one of said digit pulse trains for operating said register selector to seize one of said registers which is individual to said subscriber.

5. A telephone system comprising a plurality of subscriber lines at least some of which are single party lines; a line circuit associated with each of said subscriber lines; means under control of calling subscribers for extending calls between said lines; means comprising message register means associated with each line circuit for bulk metering billing information for said calls including means for metering information at a basic unit of time rate, means for measuring said unit of time, means for measuring overtime, and means including said bulk metering means for metering information at an overtime rate as to the charge for said overtime; two talking conductors and at least an associated control conductor for each of said lines; means under control of said calling subscriber for repeating digit pulses from said call extending means over said control conductor associated with said calling subscriber's line to said line circuit, means in said line circuit for absorbing said repeated digit pulses, and means responsive to said absorbed pulses for connecting one end of said control conductor to said message register associated with said line circuit.

6. The telephone system of claim 5 and a cyclic counting device, means for operatively associating said cyclic device with the other end of said control conductor, and means under control of said cyclic device for extending pulses over said control conductor to said register to indicate the charge required for a basic unit of conversation time.

7. The telephone system of claim 6 wherein said means for measuring the elapse of said basic unit of time comprises further operation of said cyclic device.

8. The telephone system of claim 7 and means responsive to still further operation of said cyclic device for extending more of said pulses over said control conductor to said register to indicate the charge for overtime conversation.

9. A telephone system comprising a plurality of subscriber lines, at least some of said subscriber lines being party lines serving more than two subscribers, means including a line circuit individual to each of said subscriber lines for extending calls between said lines under control of a calling subscriber, means comprising a plurality of message registers connected to each of said line circuits for bulk metering billing information for calls, each of said party line subscribers having an individual message register, said bulk metering means including means for metering information at a basic unit of time rate, means for measuring said unit of time, means for measuring overtime and means including said bulk metering means for metering information at an overtime rate as to the charge for said overtime, means including a message register selector connector to each of said party line circuits, and means responsive to digit pulses transmitted by a calling subscriber for operating said register selector to seize a particular one of said message registers which is individual to said calling subscriber.

10. A telephone system comprising a plurality of subscriber lines, at least some of said subscriber lines being party lines, means comprising a line circuit individual to each of said subscriber lines for extending calls under control of a calling subscriber, each of said lines comprising talking conductors and at least one control conductor associated therewith; means for bulk metering information for said calls comprising at least one message register connected to each of said line circuits, means for metering information at a basic unit of time rate, means for measuring said unit of time, means for measuring overtime and means including said bulk metering means for metering information at an overtime rate as to the charge for said overtime, means for extending said metering information to said message registers over said control conductors; each party line subscriber having an individual message register, means for selecting between said message registers connected to each of said party line circuits, means responsive to operation of said last named means for seizing one of said message registers which is individual to a calling one of said party line subscribers, means for substituting a marking for some of said message registers and means for preventing the extension of calls reponsive to said means for selecting registers finding said marking.

11. The telephone system of claim 10 and means under control of said calling subscriber for operating said register selector via said control conductor, said register selector having a plurality of terminals, means for connecting said message registers to at least some of said terminals, and means for connecting a battery marking to other terminals on said register selector.

12. The telephone system of claim 11 wherein said means for operating said register selector via said control conductor comprises means for extending ground pulses over said control conductor, and said bulk metering means comprises means for extending battery pulses over said control conductor for storing billing information in said message registers.

13. The telephone system of claim 12 and means responsive to said seizure for connecting said one register to one end of said control conductor, a cyclic counting device, means for operatively associating said cyclic device with the other end of said control conductor, and means under control of said cyclic device for extending said battery pulses over said control conductor to said register to indicate the charge required for a basic unit of conversation time.

14. Telephone system of claim 13 wherein said means for measuring the elapse of said basic unit of time comprises further operation of said cyclic device.

15. The telephone system of claim 14 and means also responsive to said further operation for transmitting a warning tone to said calling subscriber responsive to termination of said basic unit of time.

16. The telephone system of claim 15 and means responsive to still further operation of said cyclic device for extending more of said battery pulses over said control conductor to said register to indicate the overtime rate charge required for overtime conversation.

17. A telephone system comprising a plurality of multiparty subscriber lines each serving any number of subscribers, means comprising at least two talking and one control conductors for extending toll calls between said lines responsive to digit pulse trains transmitted by a calling subscriber, means including a plurality of message registers for bulk metering billing information for said calls as to the charge for total conversation time, there being one message register for each party line subscriber, means including a register selector associated with each of said multiparty lines for selecting one of said message registers, means for operating said register selectors comprising means for extending digit pulses in the form of pulses of a first potential over said control conductors, means responsive to said operation of said register selectors for connecting said one message register to one end of said control conductor associated with said calling subscriber's line, said bulk metering means comprising means for extending pulses of a second potential over said one control conductor for storing billing information in said message registers, a cyclic device, means for operatively associating said cyclic device with the other end of said one control conductor, and means under control of said cyclic device for extending pulses of said second potential over said one control conductor to said register to indicate the basic rate charge required for a basic unit of conversation time.

18. A telephone system comprising a plurality of subscriber lines, each of said lines comprising at least two talking and an associated control conductor for extending calls between said lines under control of a calling subscriber; means including a plurality of message registers for bulk metering information for said calls as to the charge for total conversation time; means including a register selector for seizing one of said message registers, means for operating said register selector comprising means for extending ground pulses over said control conductor, means responsive to said seizure for connecting said one message register to one end of said control conductor; said bulk metering means comprising means for extending battery pulses over said control conductor for storing billing information in said message registers; means including a cyclic device, means for operatively associating said cyclic device with the other end of said control conductor, means under control of said cyclic device for extending battery pulses over said control conductor to said seized message register to indicate the basic rate charge required for a basic unit of conversation time and means responsive to further operation of said cyclic device for measuring the elapse of said basic unit of time.

19. The telephone system of claim 18 and means responsive to still further operation of said cyclic device for extending more of said battery pulses over said control conductor to said register to indicate the overtime rate charge required for overtime conversation.

20. In a telephone system, means including two talking conductors, a sleeve conductor and an extra sleeve conductor for extending calls through said system, a cyclic device comprising a single unitary switch having a plurality of wipers, means for operatively associating said cyclic device with said extra sleeve conductor, message register means also associated with said extra sleeve conductor, means responsive to operation of said cyclic device for extending pulses over said extra sleeve conductor to operate said register to indicate the basic rate charge required for a basic unit of conversation time, and means responsive to further operation of said cyclic device for measuring the elapse of said basic unit of conversation time.

21. The telephone system of claim 20 and means also responsive to said further operation for transmitting a warning tone to said calling subscriber responsive to termination of said basic unit of conversation time.

22. The telephone system of claim 21 and means responsive to still further operation of said cyclic device for extending more of said pulses over said extra sleeve conductor to said register to indicate the overtime rate charge required for overtime conversation.

23. In a telephone system, two classes of subscriber lines, a line circuit individual to each of said lines, message registers, each line circuit of one of said classes of subscriber lines having a single message register connected thereto, a plurality of said registers being connected to each line circuit of the other of said classes of subscriber lines, electro-mechanical telephone switches, means comprising talking conductors and at least one associated control conductor for extending calls from any of said subscriber lines through at least one of said switches responsive to digit pulses transmitted over said talking conductors, means for repeating some of said digit pulses through said one switch and back over one of said control conductors which is individual to that one of said line circuits which is associated with a calling subscriber, means in said line circuits of said one class for absorbing said repeated pulses and means in said line circuits of said other class for selecting among said plurality of message registers.

24. The system of claim 23 and means responsive to said absorbed digit or to said selection for connecting one of said message registers to one end of one of said control conductors.

25. The system of claim 24 and means connected to the other end of said one control conductor for transmitting bulk billing information over said control conductor to said one message register.

26. A telephone system comprising a plurality of telephone offices, trunk lines interconnecting said offices, a plurality of subscriber lines in said offices, said subscriber lines being divided into two classes, a line means for bulk metering billing information comprising a plurality of message registers, there being one register for each subscriber in each of said two classes, a line circuit for each of said subscriber lines, said message resisters being associated with said line circuits, at least one electro-mechanical switch for extending a calling one of said subscriber lines in said first office to subscriber lines in said second office via said trunk lines, said electro-mechanical switch including talking conductors and at least one associated control conductor, a trunk circuit, means operative over said calling subscriber line for controlling said switch by means of digit pulses sent via said talking conductors to seize said trunk circuit, means in said trunk circuit for repeating at least a portion of said digit pulses in the form of ground pulses extended over said control conductor through said switch to said line circuit, means in said line circuit of one of said classes of subscriber lines for absorbing said repeated ground pulses, a register selector connected to said line circuit of said other class of subscriber lines, said register selector having a plurality of terminals, said message registers being connected to some of said terminals, a battery marking being connected to other of said terminals, said register selector being operative responsive to said ground pulses for seizing one of said message registers, means responsive to either said seizure or said absorbed pulses for connecting a register to one end of said control conductor, a cyclic device, means for operatively associating said cyclic device with the other end of said control conductor, means under control of said cyclic device for extending battery pulses over said control conductor to store in said connected register the base rate charges required for a basic unit of conversation time, means responsive to further operation of said cyclic device for measuring the elapse of said basic unit of time, means also responsive to said further operation for transmitting a warning tone to said calling subscriber responsive to termination of said basic unit of time, means responsive to still further operation of said cyclic device for extending more of said battery pulses over said control conductor to said register to indicate the overtime rate charge required for overtime conversation.

References Cited in the file of this patent

UNITED STATES PATENTS

| | | |
|---|---|---|
| 1,858,863 | Ostline | May 17, 1932 |
| 1,943,130 | MacPherson | Jan. 9, 1932 |
| 2,387,897 | Grandstaff | Oct. 30, 1945 |
| 2,457,946 | Taylor et al. | Jan. 4, 1949 |
| 2,486,722 | Stehlik | Nov. 1, 1949 |
| 2,522,000 | Shepherd | Sept. 12, 1950 |
| 2,535,509 | Ostline | Dec. 26, 1950 |
| 2,543,022 | Horwitz | Feb. 27, 1951 |
| 2,570,239 | Horwitz | Oct. 9, 1951 |
| 2,586,704 | Ostline | Feb. 19, 1952 |
| 2,595,062 | Elliott | Apr. 29, 1952 |
| 2,599,358 | Cahill et al. | June 3, 1952 |
| 2,603,713 | Ostline | July 15, 1952 |
| 2,629,016 | Gooderham | Feb. 17, 1953 |
| 2,724,741 | Lomax | Nov. 22, 1955 |

UNITED STATES PATENT OFFICE

CERTIFICATE OF CORRECTION

Patent No. 2,851,530 September 9, 1958

James D. Confeld

It is hereby certified that error appears in the printed specification of the above numbered patent requiring correction and that the said Letters Patent should read as corrected below.

Column 5, line 9, for "seizng" read -- seizing --; line 74, for "receipts" read -- receipt --; column 12, line 40, for "connector" read -- connected --.

Signed and sealed this 12th day of May 1959.

(SEAL)

Attest:

KARL H. AXLINE

Attesting Officer

ROBERT C. WATSON

Commissioner of Patents